US011212094B2

(12) United States Patent
Diaz Vico et al.

(10) Patent No.: US 11,212,094 B2
(45) Date of Patent: Dec. 28, 2021

(54) JOINT BLIND KEY ESCROW (71) Applicant: Covault Inc., San Francisco, CA (US)

(72) Inventors: Jesus Diaz Vico, Thalwil (CH); Carlos Kuchkovsky Jimenez, Madrid (ES); Louie Gasparini, San Mateo, CA (US)

(73) Assignee: Banco Bilbao Vizcaya Argentaria, S.A., Madrid (ES)

( * ) Notice: Subject to any disclaimer, the term of this patent is extended or adjusted under 35 U.S.C. 154(b) by 98 days.

(21) Appl. No.: 16/650,301

(22) PCT Filed: Sep. 27, 2018

(86) PCT No.: PCT/EP2018/076227
§ 371 (c)(1),
(2) Date: Mar. 24, 2020

(87) PCT Pub. No.: WO2019/063674
PCT Pub. Date: Apr. 4, 2019

(65) Prior Publication Data
US 2020/0295934 A1  Sep. 17, 2020

(30) Foreign Application Priority Data

Sep. 27, 2017  (EP) .................................... 17382642

(51) Int. Cl.
*H04L 29/06* (2006.01)
*H04L 9/08* (2006.01)
(Continued)

(52) U.S. Cl.
CPC .......... *H04L 9/0894* (2013.01); *H04L 9/0637* (2013.01); *H04L 9/14* (2013.01);
(Continued)

(58) Field of Classification Search
CPC ....... H04L 9/0894; H04L 9/0637; H04L 9/14; H04L 9/3231; H04L 9/3257; H04L 2209/046; H04L 2209/38
See application file for complete search history.

(56) References Cited

U.S. PATENT DOCUMENTS 6,549,626 B1 *  4/2003  Al-Salqan ............. H04L 9/0643
                                                       380/277
2003/0012386 A1 *  1/2003  Kim ...................... H04L 9/3226
                                                       380/286
(Continued)

FOREIGN PATENT DOCUMENTS

CN      102420810 A   *  4/2012
DE   112017002263 T5  *  1/2019  ........... H04L 9/3247
(Continued)

OTHER PUBLICATIONS

International Search Report and Written Opinion received in International Application No. PCT/EP2018/076227.
(Continued)

*Primary Examiner* — John B King
(74) *Attorney, Agent, or Firm* — ALG Intellectual Property, LLC (57) ABSTRACT

A computer-implemented method for escrowing secret data in a server of a client-server network, the client-server network comprising: a first client having at least one public and private client key pairs, at least one trusted client having at least one public and private trusted client key pairs, a server having a public and private server key pairs, a blockchain system comprising a plurality of nodes which are configured to store the public keys of the elements of the client-server network. It is also described a computer-implemented method for obtaining secret data of a server wherein the secret data is escrowed with the above computer-implemented method for escrowing secret data in a server. Sys- (Continued)

tem, computer-readable mediums and computer programs, which are configured to implement or perform said computer-implemented methods, are also described.

11 Claims, 3 Drawing Sheets

(51) Int. Cl.
*H04L 9/06* (2006.01)
*H04L 9/14* (2006.01)
*H04L 9/32* (2006.01)

(52) U.S. Cl.
CPC .......... *H04L 9/3231* (2013.01); *H04L 9/3257* (2013.01); *H04L 2209/046* (2013.01); *H04L 2209/38* (2013.01)

(56) References Cited

U.S. PATENT DOCUMENTS

| | | | |
|---|---|---|---|
| 2005/0066175 A1* | 3/2005 | Perlman | H04L 63/0428 713/176 |
| 2011/0093721 A1* | 4/2011 | Perlman | G06F 21/602 713/189 |
| 2016/0300234 A1* | 10/2016 | Moss-Pultz | G06F 21/64 |
| 2018/0191714 A1* | 7/2018 | Jentzsch | H04L 63/126 |

FOREIGN PATENT DOCUMENTS

| | | | | |
|---|---|---|---|---|
| EP | 0869635 A2 | * | 10/1998 | ........... H04L 9/0894 |
| EP | 1130843 B1 | * | 3/2006 | ............... H04L 9/30 |
| JP | H10274926 A | * | 10/1998 | |
| JP | 2002051036 A | * | 2/2002 | |
| JP | 2019016997 A | * | 1/2019 | ........... H04L 9/3239 |
| KR | 20010067966 A | * | 7/2001 | ........... H04L 9/0894 |
| WO | 1999004530 | | 1/1999 | |
| WO | WO-2007118311 A1 | * | 10/2007 | ......... H04N 21/2347 |
| WO | 2015135063 | | 9/2015 | |

OTHER PUBLICATIONS

Notification of Transmittal of the International Preliminary Report on Patentability Received in International Application No. PCT/EP2018/076227.
Green, et al., Secure Blind Decryption, International Association for Cryptologic Research 2011.
Lazarovich, et al., Invisible Ink: Blockchain for Data Privacy, Massachusetts Institute of Technology 2015.
Zyskind, et al., Decentralizing Privacy: Using Blockchain to Protect Personal Data, 2015 IEEE CS Security and Privacy Workshops.

* cited by examiner

JOINT BLIND KEY ESCROW

TECHNICAL FIELD OF THE INVENTION

The invention is related to the field of cryptography. Particularly, it relates to the field of key escrowing or private data escrowing. More particularly, it relates to a method for escrowing private keys, secrets, passwords or other similar private data by a user.

BACKGROUND OF THE INVENTION

Nowadays due to the characteristics of the digital world, i.e., internet and the forthcoming internet of the things, IoT, secure credentials management is a delicate task. As secure credentials it should be understood any secret data which any user wants to remain in secret in order to avoid any impersonation, or any unauthorized access to any of his personal data, such as a password or a cryptographic key.

Normally, the solution to this problem is boiled down to either requiring the user to store or memorize the secret data, or relying on a third party to do it on behalf of the user.

In the first case, no trust on third parties is needed, but the system has many vulnerabilities. If the user memorizes the secret data and said user loses or forgets the secret value, there is no way to recover it. This also occurs in the case of the user stores the secret data in a memory, such as a memory stick.

In the second case, the third party may be a malicious party or it may be hacked. In both situations, the third party could impersonate the user and access to any secret data of the user such as email account or bank account.

WO 99/04530 describes a system that allows storing encrypted data, with an authority that escrows the keys used to encrypt this data (the Key Recovery Agent). The keys used to encrypt the data are in turn encrypted with a key under the control of the Key Recovery Agent. However, the Key Recovery Agent can unilaterally recover the encrypted data and, e.g., impersonate the owner of the encrypted data if this data consists of authenticating information.

Invisible Ink: Blockchain for Data Privacy discloses a platform that securely distributes encrypted user-sensitive data. International patent application WO/2015/135063A1 discloses a system and method for secure deposit and recovery of secret data. Decentralizing Privacy: Using Blockchain to Protect Persona Data discloses a decentralized personal data management system that ensures users own and control their data.

Therefore, there is a need that the users can securely escrow private keys, passwords or other similar private/secret data and securely retrieve the escrowed secret data, avoiding any impersonation for any malicious third party.

SUMMARY OF THE INVENTION

The present invention provides an alternative solution for the aforementioned problems, by a computer-implemented method for escrowing secret data in a server of a client-server network, a computer-implemented method for obtaining secret data in a server of a client-server network, a system, computer-readable medium and computer programs. In dependent claims, preferred embodiments of the invention are defined.

In a first inventive aspect, the invention provides a computer-implemented method for escrowing data in a server of a client-server network, the client-server network comprising:

a first client having at least one public and private client key pairs, at least one trusted client having at least one public and private trusted client key pairs, wherein the public and private trusted client key pairs are a public key and a private key related to each trusted client, a server having a public and private server key pairs, a blockchain system comprising a plurality of nodes which are configured to store the public keys of the elements of the client-server network, the blockchain system being configured to ensure the correctness and uniqueness of the public keys stored in the plurality of nodes, wherein the method comprises the following steps:

a) fetching by the first client from the blockchain system the public key of a trusted client, b) cryptographically blinding by the first client, a secret data with a random value obtaining a first blinded secret, c) signing by the first client, the first blinded secret, obtaining a digital signature of the first blinded secret, d) encrypting by the first client, the first blinded secret and the digital signature of the first blinded secret using the public key of the trusted client obtaining a first public encrypted secret, e) sending by the first client to the server, the first public encrypted secret, f) forwarding by the server to the trusted client, the first public encrypted secret, g) when the trusted client receives the first public encrypted secret from the server, fetching by the trusted client from the blockchain system the public key of the first client and decrypting by the trusted client the first public encrypted secret using its private key obtaining the first blinded secret, h) verifying by the trusted client the digital signature of the first blinded secret using the public key of the first client, if the digital signature is valid the method continues in step i), i) blindly encrypting by the trusted client, the first blinded secret with a random secret key obtaining a second blinded secret, j) signing by the trusted client, the second blinded secret, obtaining a digital signature of the second blinded secret, k) encrypting by the trusted client, the second blinded secret and the digital signature of the second blinded secret using the public key of the first client obtaining a second public encrypted secret, l) sending by the trusted client to the server, the second public encrypted secret, m) forwarding by the server to the first client, the second public encrypted secret, n) when the first client receives the second public encrypted secret from the server, decrypting by the first client the second public encrypted secret using its private key obtaining the second public encrypted secret, o) verifying by the first client the digital signature of the second blinded secret using the public key of the trusted client, if the digital signature is valid the method continues in step p), p) cryptographically unblinding by the first client second blinded secret with the random value, obtaining an encrypted secret, q) signing by the first client, the encrypted secret using the private key of the first client obtaining a digital signature of the encrypted secret, r) sending by the first client to the server, the encrypted secret and the digital signature of the encrypted secret, s) when the server receives the encrypted secret and the digital signature of the encrypted secret, verifying the digital signature of the encrypted secret using the public key of the first client, and if the digital signature of the encrypted secret is valid, encrypting by the server, the encrypted secret with the public key of the server obtaining a double-encrypted secret and storing the double-encrypted secret in the server.

Throughout this entire document, secret data will be understood as any data which is only known by the first client, for example, a password or a cryptographic key. The secret data is additionally a digital file.

The client-server network interconnects clients through servers and it also comprises a blockchain system. In this invention, the blockchain is a distributed database wherein the nodes store the public keys of clients of the entire client-server network, and the clients and the server of the client-server network are configured to access to the data stored in the blockchain system. In one embodiment, the public key is associated with a name o ID, for example, the public key of the first client is associated with the name "User1" and the public key of one trusted client is associated with the name "User2".

The blockchain system stores which user has registered the public keys. Advantageously, it specifically ensures that client public keys are not modified surreptitiously or recently modified during the performance of the method. Additionally, it also ensures the correctness and uniqueness of said public key.

In the context of the invention the public keys of each client belong to an asymmetric cryptosystem. As an asymmetric cryptosystem, it should be understood a cryptosystem where the private key is kept private or secret by the computer and the public key is public to any third party. Therefore, any data encrypted with the public key can be only decrypted using its correspondence private key.

As a digital signature it should be understood as mathematical scheme for demonstrating the authenticity of digital messages or documents. A valid digital signature gives a recipient reason to believe that the message was created by a known sender, that the sender cannot deny having sent the message, and that the message was not altered in transit. In this case, a private key is used to generate the digital signature, while its corresponding public key is used to verify said signature.

Additionally, singing any data and verifying the digital signature of said data it should be understood as applying any of the protocols in public cryptosystems. In one embodiment, the public cryptosystems for sign and verify in steps c), h), j), o), q) and s) may be RSA, ElGamal or DSA. In one embodiment, the server comprises all the public keys of the clients registered in the blockchain system. As the digital signature of the encrypted secret is signed with the private key of the first user, the server can verify if said digital signature is signed by the first user using the public key of the first user. In other embodiment, the server can fetch the public key of the first client upon receiving the first public encrypted secret of said first client. In other embodiment, there is a previous step from step a) where the server fetches the public keys of the clients registered in the blockchain system. Advantageously, no other client can impersonate to store secrets in server as the first client.

It should be understood in the context of the invention that a client is an electronic device such as a computer, a smartphone or tablet where at least one process can be executed by the electronic device. In other embodiment, a client may be a process running inside said electronic device, and therefore, the electronic device may comprise two clients. Additionally, a trusted client is a client of the client-server network wherein a different client chooses it in order to escrow the data.

As cryptographically blinding it should be understood as a process which encodes determined data using an algorithm, such that other parties can still processing with the encoded data, without knowing its meaning of said encoded data. As a consequence, cryptographically unblinding is the reverse process of cryptographically blinding which is configured to obtain the data from the encoded data. In one embodiment, cryptographically blinding and cryptographically unblinding comprise applying the same mathematical operator.

As blindly encrypting it should be understood as a process of encrypting data that has been cryptographically blinded in advance. Thus, the entity encrypting the blinded data does not gain any knowledge of the data that is being encrypted.

Advantageously, the computer-implemented method for escrowing data avoids the impersonation of any third party, either the trusted client or the server. As a security layer is always applied to the secret data before leaving the first client, the resistance against the impersonation is increased. Security layer should be understood as any encryption or blinding process or digital signatures performed or sent in the secret data. In particular, the following security layers are included when the secret leaves any of the client users:

in step e) when first public encrypted secret is sent, it comprises a double security layer added in steps b) and d) of the method. This number of security layers is also maintained in step f).

in step l) when second public encrypted secret is sent, it comprises a triple security layer added in steps b), i) and k) of the method.

in step r) when private encrypted secret is sent, it comprises a security layer added in step i) of the method. Additionally, this security layer is stronger against any attack because breaking it will require collusion between the server and the trusted client.

Finally, when the secret data is escrowed in the server, i.e., the double-encrypted secret, it has a double security layer added in steps i) and s) of the present invention. Due to the number of security layers and its components, any malicious third party which wants to tamper or impersonate the information is not able to access to the secret data because said third party would need the information used in the process performed in steps b), c), d), i), j), k), p), q) and/or s) of the method.

As it can be clearly appreciated, the first inventive aspect does not use any password, i.e. is passwordless. Thus for clarification, the first inventive aspect can be also defined as a computer-implemented method for passwordless escrowing secret data.

It should be understood that a password and a random value are different concepts and features. A password is an element that must be stored in a long period of time, such as months or years, and it cannot be deleted or missed. On the other hand, the random value is an element that may not be maintained in a long period of time and it may be deleted. For example, it can be appreciated that the first client may delete the used random value after step p), and the first client may continue normally escrowing the secret using the method of the invention.

In a particular embodiment, any sending in the client-server network between the first client, the trusted client and the server is ciphered, preferably using transport layer security, TLS.

In a particular embodiment, cryptographically blinding in step b) comprises,
calculating by the first client the random value,
computing by the first client a bitwise XOR of the random value and the secret data obtaining the first blinded secret.

In a particular embodiment, cryptographically unblinding in step p) comprises computing by the first client a bitwise XOR of the random value and the second blinded secret obtaining the encrypted secret.

In a particular embodiment, blindly encrypting in step i) comprises:
calculating by the trusted client the random secret key,
computing by trusted client a bitwise XOR of the random secret key and the first blinded secret obtaining the second blinded secret.

The above embodiments use one or more random values in order to add a security layer to the process of escrowing the secret data, which advantageously avoids that the trusted client can access to the secret data.

In a particular embodiment, encrypting in step d) further comprises encrypting by the first client, the first blinded secret and a biometric authenticating data of the first client using the public key of the trusted client obtaining the first public encrypted secret.

In a particular embodiment, the step i) further comprises storing by the trusted client, the biometric authenticating data of the first client.

The biometric authenticating data are data related with a measurement of a human characteristic such as the finger print, iris and/or retina.

In a particular embodiment, step a) further comprises checking by the first client in the blockchain system, the identity of the at least one trusted client which stored the public key of the trusted client.

In a particular embodiment, step g) further comprises checking by the trusted client in the blockchain system, the identity of the first client which stored the public key of the first client.

As identity should be understood the parameter which identifies a client. Due to the features of the blockchain system, any client of the client-server network which performs any registration in said system is registered on the blockchain system, where registration on the blockchain system means writing its public key in said blockchain system. Thus, if the first client registers its public key, it is registered the public key, the client to which belongs said key and the client which has performed the registration in the blockchain system. Thus, in the above embodiments, the first client and the trusted client may use the blockchain system to check any modifications on the public key for authentication in the above mentioned embodiments. Advantageously, these embodiments ensure that client public keys are not modified surreptitiously.

In a second inventive aspect, the invention provides a computer-implemented method for obtaining secret data of a server of a client-server network, wherein said secret data is escrowed with a computer-implemented method according to any of the embodiments of the first inventive aspect, wherein the client-server network comprising:
a first client having at least one public and private client key pairs,
at least one trusted client having at least one public and private trusted client key pairs, wherein the public and private trusted client key pairs are a public key and a private key related to each trusted client,
a server having a public and private server key pairs,
a blockchain system comprising a plurality of nodes which are configured to store the public keys of the elements of the client-server network, the blockchain system being configured to ensure the correctness and uniqueness of the public keys stored in the plurality of nodes,
wherein the method comprises the following steps:
1) requesting by the first client to the server, the double-encrypted secret of the first client,
2) when the server receives the request, decrypting by the server the double-encrypted secret using its private key obtaining the encrypted secret,
3) sending by the server to the first client, the encrypted secret,
4) when the first client receives the encrypted secret from the server, generating by the first client a second public and private client key pairs,
5) fetching by the first client from the blockchain system the public key of a trusted client and encrypting by the first client, the second public client key with the public key of the trusted client obtaining an encrypted second public client key,
6) sending by the first client to the server, the encrypted second public client key,
7) forwarding by the server to the trusted client, the encrypted second public client key,
8) when the trusted client receives the encrypted second public client key from the server, decrypting by the trusted client the encrypted second public client key using its private key obtaining the second public client key and encrypting the random secret key with the second public client key obtaining an encrypted random secret key,
9) sending by the trusted client to the server, the encrypted random secret key,
10) forwarding by the server to the first client, the encrypted random secret key,
11) when the first client receives the encrypted random secret key, decrypting by the first client the encrypted random secret key using its second private key obtaining the random secret key,
12) decrypting by the first client the encrypted secret using the random secret key obtaining the secret.

As it can be clearly appreciated, the second inventive aspect does not use any password, i.e. is passwordless. Thus for clarification and as the first inventive aspect, the second inventive aspect can be also defined as a computer-implemented passwordless method for obtaining secret data of a server of a client-server network.

As it has been commented in the second inventive aspect, the first client does not require the random value to obtain the escrowed secret. Thus in view of the definition of password, as the method disclosed in the first and second inventive aspects do not require to store any further numbers or text during a long period of time, i.e., they do not use any passwords, said methods are passwordless.

It should be understood that "said escrowed secret data is escrowed with a computer-implemented method according to any of the embodiments of the first inventive aspect", is similar to that the method comprises a previous step of escrowing a secret data according to any of the embodiments of the computer-implemented method of the first inventive aspect.

Advantageously, the random secret key is encrypted with a second public key which only is known by the first client and the trusted client. Additionally, the computer-implemented method for obtaining escrowed data avoids the impersonation of any third part including the trusted client and server, because of the introduced cryptographic mechanisms.

In one embodiment, wherein the secret data is escrowed with the computer-implemented method according to the embodiment, wherein the step i) of blinding encrypting of the first inventive aspect comprises calculating by the trusted client a random secret key, and computing by trusted client a bitwise XOR of the random secret key and the first blinded secret obtaining the second blinded secret. In this embodiment, decrypting in step 12) comprises computing by the first client a bitwise XOR of the random secret key and the encrypted secret obtaining the secret data.

As it is above indicated, it should be understood that, "wherein the secret data is escrowed with the computer-implemented method according to the embodiment of the first inventive aspect, wherein the step i) of blinding encrypting of the first inventive aspect further comprises calculating by the trusted client a random secret key and computing by trusted client a bitwise XOR of the random secret key and the first blinded secret obtaining the second blinded secret", is similar to the method comprises a previous step of escrowing a secret data according to the embodiment of the computer-implemented method of the first inventive aspect, wherein the step i) of the first inventive aspect further comprises calculating by the trusted client a random secret key and computing by trusted client a bitwise XOR of the random secret key and the first blinded secret obtaining the second blinded secret.

Advantageously, this embodiment allows obtaining an escrowed secret data from XOR-based blind encryption.

In one embodiment, wherein the secret data is escrowed with the computer-implemented method according to the embodiment of the first inventive aspect, wherein the step d) of encrypting further comprises encrypting by the first client, the first blinded secret, the digital signature of the first blinded secret and a biometric authenticating data of the first client using the public key of the trusted client obtaining a first public encrypted secret, and wherein the step i) further comprises storing by the trusted client, the biometric authenticating data of the first client, encrypting in step 5) further comprises encrypting the second public client key and a biometric authenticating data of the first client with the public key of the trusted client obtaining the encrypted second public client key.

In one embodiment, the step 8) further comprises verifying the biometric authenticating data of the first client, and if the biometric authenticating data of the first client is valid continue with step 9) and if the biometric authenticating data of the first client is invalid deleting the second public client key.

In the above embodiments, the biometric authenticating data of the first client has been firstly stored in step i) of the method of the first inventive aspect. Now, the trusted client only has to check if the biometric authenticating data received in step 8) is similar that the biometric authenticating data of the first client has been firstly stored in step i) of the method of the first inventive aspect. As the biometric authenticating data is exclusively related to one user of the first client, any man-in the middle attack is advantageously avoided. Advantageously, the above embodiments also increase the security of the transmissions between the first user and the trusted client and enhance the integrity of the data because avoid that none non-legitimate client obtains the random secret key.

In a particular embodiment, step 5) further comprises checking by the first client in the blockchain system, the identity of the trusted client which stored the public key of the trusted client.

As it has been commented in the first inventive aspect, the first client checks on the blockchain system if the public key from the trusted client has been subjected to any suspicious modification. In that case, the first client advantageously detects that said key has been modified surreptitiously and stops.

All the embodiments of the computer-implemented methods of the first and second inventive aspects may be coordinated by the first client. With respect to the computer-implemented method of the first inventive aspect, in the step e) the first client additionally orders that the content received by the server must be forward to the trusted client. Additionally, the message comprises instructions for the trusted client: the trusted client must sent back a blindly encrypted version of the content of the message, the first public encrypted secret, encrypted with the public key of the first client. In step r) the first client additionally orders to secure store content received by the server.

With respect to the computer-implemented method of the second inventive aspect, in the step 6) the first client additionally orders that the content received by the server must be forward to the trusted client. Additionally, the message comprises instructions to the trusted client: the trusted client must sent back the random secret key encrypted with the second public client key.

In other embodiments of the computer-implemented methods of the first and second inventive aspects, other types of blind encryption or blind decryption may be applicable, for example, the blind decryption scheme described in the document of Matthew Green: Secure Blind Decryption. IACR Cryptology ePrint Archive 2011: 109 (2011). The only requirement is that the secret data that is encrypted in the method of the first inventive concept can be decrypted using the method of the second inventive concept, without the trusted party having access to the secret data in the clear at any moment. Similar requirement is needed to the processes of cryptographically blinding and the cryptographically unblinding.

In a third inventive aspect, the invention provides a system comprising
- a server configured to perform the method steps of the method according to any of the previous embodiments when they are referred to the server,
- a first electronic device in communication to the server through a telecommunications network configured to perform any of the method steps according to any of the previous embodiments when they are referred to the first client,
- a second electronic device in communication to the server through a telecommunications network configured to perform any of the method steps according to any of the previous embodiments when they are referred to the trusted client.

The system of the third inventive aspect is configured to escrow secret data in a server when the server, the first electronic device and the second electronic device perform any of the computer-implemented method steps of any of embodiments of the first inventive aspect. Additionally, the system of the third inventive aspect is also configured to obtaining escrowed secret data when the server, the first electronic device and the second electronic device perform any of the computer-implemented method steps of any of embodiments of the second inventive aspect.

In a fourth inventive aspect, the invention provides a computer-readable medium comprising instructions which, when executed by a computer, causes the computer to carry out the steps of the method of any of the embodiments of the first inventive aspect.

In a fifth inventive aspect, the invention provides a computer-readable medium comprising instructions which, when executed by a computer, causes the computer to carry out the steps of the method of any of the embodiments of the second inventive aspect.

In a sixth inventive aspect, the invention provides a computer program comprising computer program code which, when executed by a computer, causes the computer to carry out the steps of the method of any of the embodiments of the first inventive aspect.

In a seventh inventive aspect, the invention provides a computer program comprising computer program code which, when executed by a computer, causes the computer to carry out the steps of the method of any of the embodiments of the second inventive aspect.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

Figure 1:
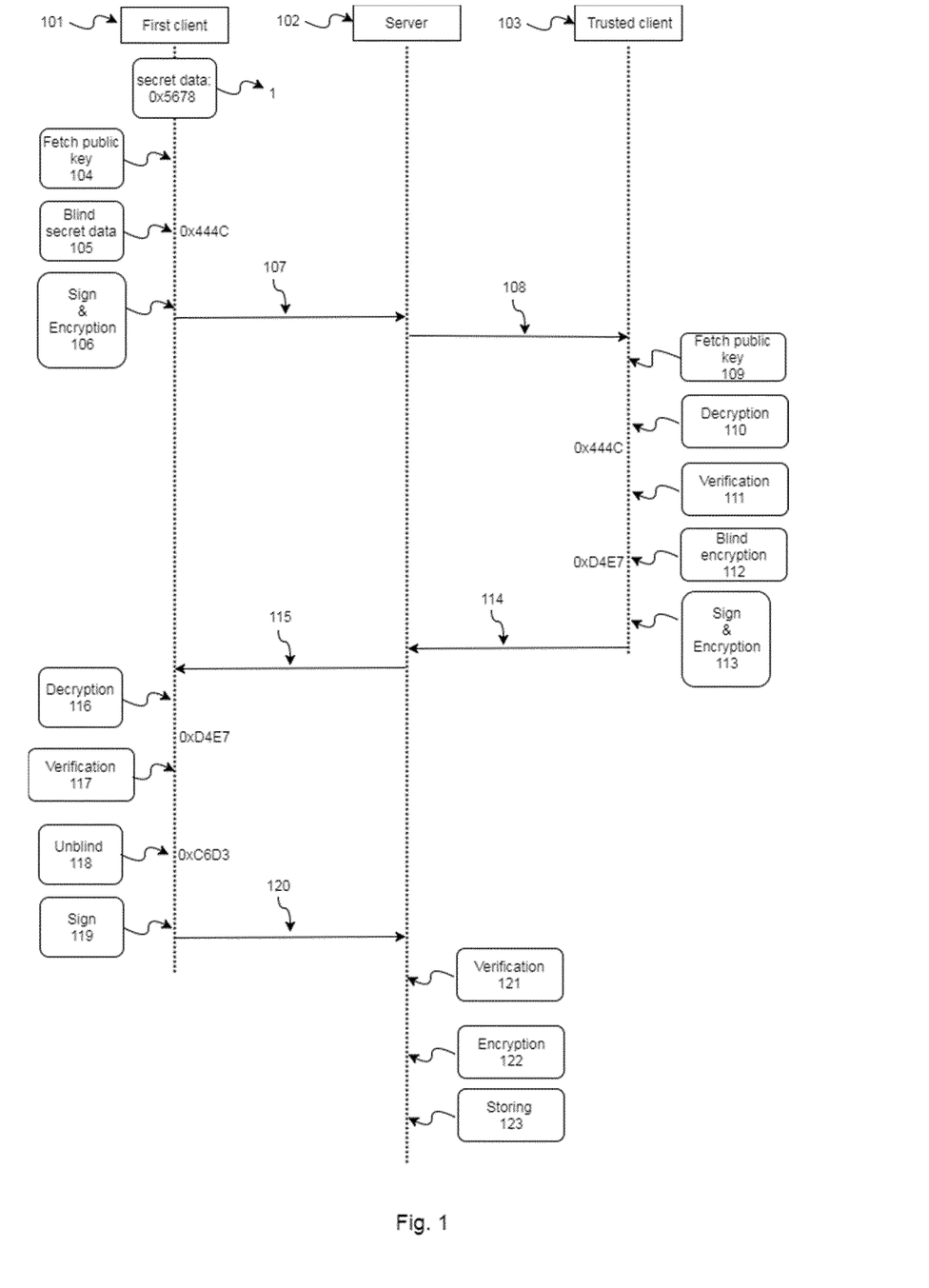
FIG. 1 This figure shows an embodiment according to the invention of a computer-implemented method for escrowing data in a server.
Figure 2:
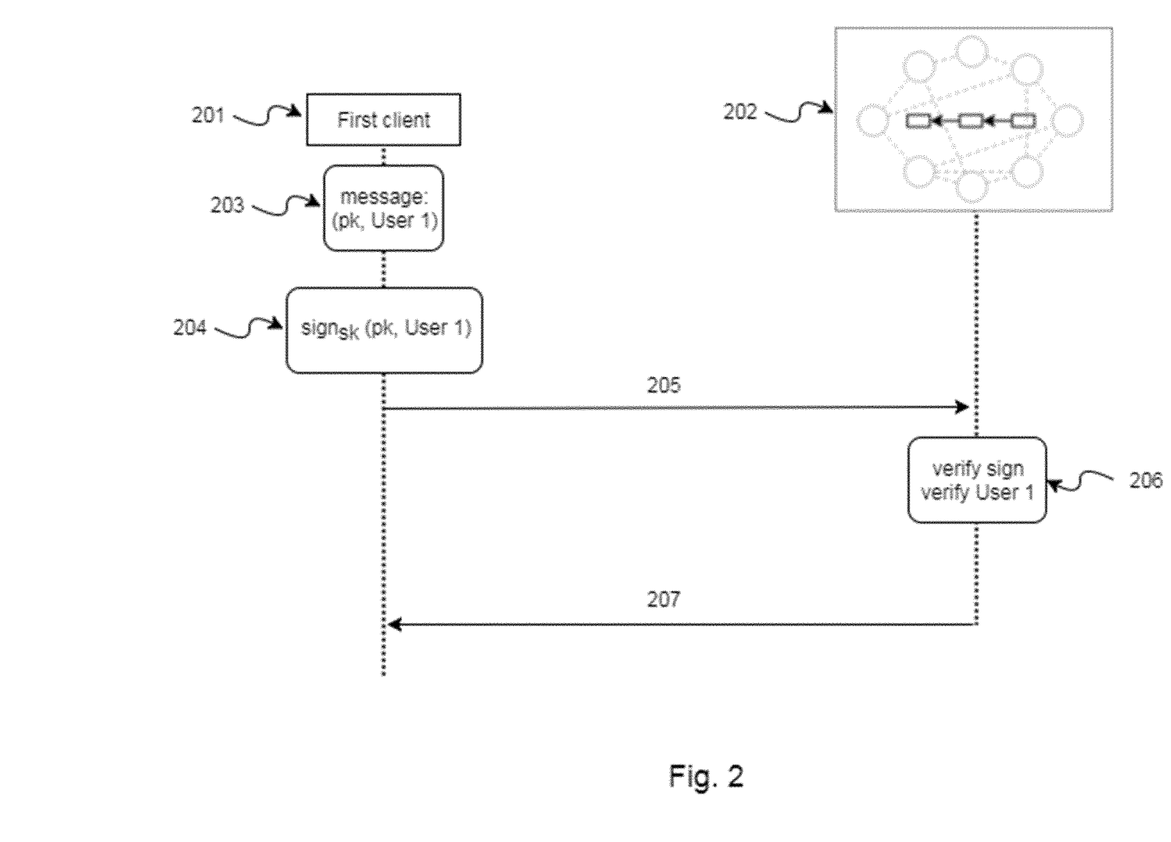
FIG. 2 This figure shows an embodiment of the updating process of the public key of a client a blockchain system.
Figure 3:
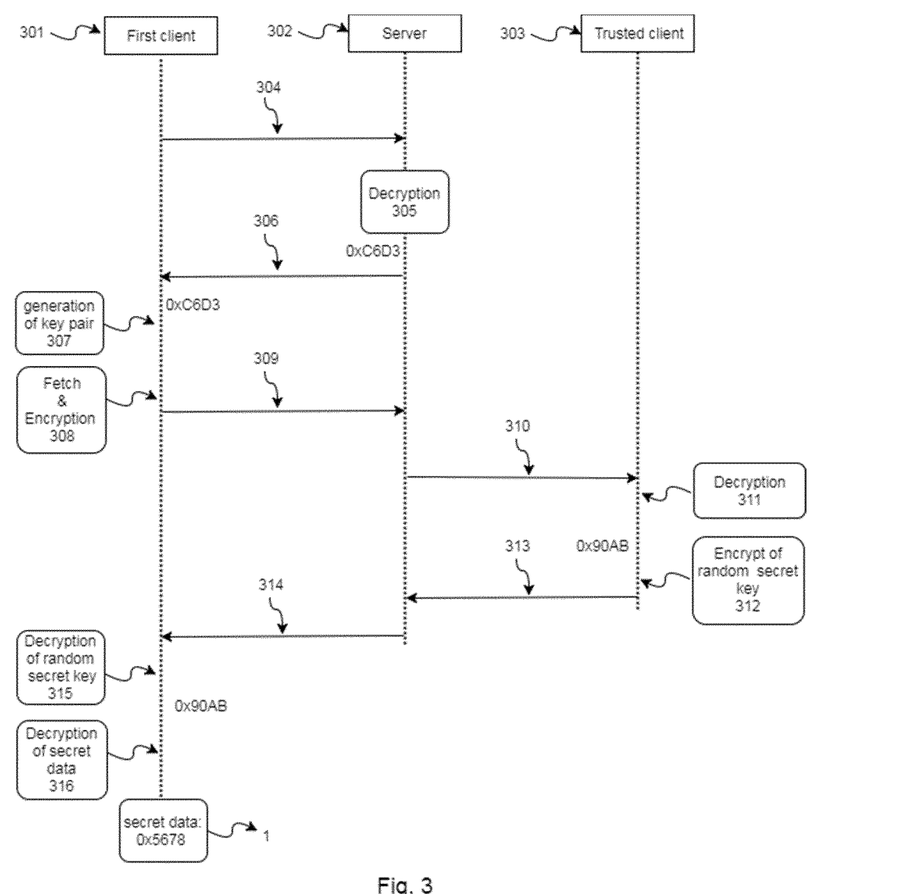
FIG. 3 This figure shows an embodiment according to the invention of a computer-implemented method for obtaining escrowed data of a server.

FIGS. 1 to 3 show embodiments of the present invention. In particular, in said figures it is also represented a system configured to implement the computer-implemented method for escrowing secret data in a server of the present invention, and the computer-implemented method for obtaining the escrowed secret data of a server of the present invention.

In FIGS. 1 and 3, it can be appreciated a schematic representation of the system. In particular, the client-server network comprises a first client (101), a server (102) and a trusted client (103). The elements of the client server-network may be connected via Ethernet cable or wireless. Also the elements may be located in different local networks or in the same network. Additionally, FIG. 2 describes the connection between the blockchain system and the clients of the client-server network.

FIG. 1: Escrowing Secret Data (1)

FIG. 1 shows an example of the implementation by the first client (101) of the computer-implemented method for escrowing data in a server (102) of the invention. In this embodiment, the server (102) comprises all the public keys of the clients registered in the blockchain system. In other embodiment, the server may fetch the public key of the first client upon receives the first public encrypted secret of said first client. In other embodiment, there is a previous step from step a) where the server fetches the public keys of the clients registered in the blockchain system.

Firstly, the first client (101) fetches (104) the public key of the trusted client (103) from the blockchain system. As the first client is registered in the blockchain system, the first client can fetch to any of the data stored in said blockchain system, in this case, the public key of the trusted client (103). Thus, in this embodiment the blockchain system is a private blockchain, for example, a private Hyperledger Fabric blockchain or a private Ethereum blockchain, because only the clients or server registered can fetch the information of the blockchain system.

In other embodiments, the blockchain system is a public blockchain where any entity may access to the data stored on the blockchain system. In these embodiments, blockchain system may be Namecoin, Certcoin or Blockstack systems.

Then, the first client cryptographically blinds (105) a secret data (1). In this embodiment the secret data (1) is a password of the first client (101), "0x5678". Further, the blinding process (105) is performed by firstly calculating a random value, "0x1234", and applying a bitwise XOR obtaining a first blinded secret. In particular, the random value is "0x1234" and the first blinded secret is obtained as follows:

$$\text{first blinded secret} = XOR(\text{secret data, random value})$$
$$= XOR(0x5678, 0x1234)$$
$$= 0x444C$$

In this embodiment in order to enhance the security of the method, the first client (101) uses its biometric authenticating data from his finger print. In other embodiments, the source of biometric data may be different, for example, biometric data based on retina or iris.

Then, the first client (101) signs (106) the first blinded secret, obtaining a digital signature of the first blinded secret, and encrypts (106) the first blinded secret, "0x444C", the biometric authenticating data and the digital signature of the first blinded secret using the public key of the trusted client (103) obtaining a first public encrypted secret.

The first user (101) sends (107) the first public encrypted secret to the server (102), and the server (102) forwards (108) it to the trusted client (103, 303).

When the trusted client (103) receives the first public encrypted secret from the server (102), the trusted client (103) fetches (109) from the blockchain system the public key of the first client (101). Then, the trusted client (103) decrypts (110) the first public encrypted secret using its private key obtaining the first blinded secret, "0x444C". In this stage, it can be appreciated that the trusted client (103) does not have access to the secret data (1) avoiding any possibility of impersonation. Additionally, the trusted client (103) verifies (111) the digital signature of the first blinded secret using the public key of the first client (101) and stores the biometric authenticating data. If the verifying is failed, the trusted client (103) deletes the first blinded secret, "0x444C" and the method stops.

If the verifying is valid, the trusted client (103) further blindly encrypts (112) the blinded secret with a random secret key obtaining a second blinded secret as follows:
calculating the random secret key, "0x90AB", and
computing a bitwise XOR of the first blinded secret 0x444C, random secret key 0x90AB, i.e:

$$\text{second blinded secret} = XOR(\text{first blinded secret}, \text{random secret key})$$
$$= XOR(0x444C, 0x90AB)$$
$$= 0xD4E7$$

being the second blinded secret 0xD4E7. Then, the trusted client (103) signs (113) the second blinded secret, obtaining a digital signature of the second blinded secret and encrypts (113) the second blinded secret "0xD4E7" and the digital signature of the second blinded secret using the public key of the first client (101) obtaining a second public encrypted secret, and sends (114) the second public encrypted by the trusted client (103, 303) to the server (102, 302) which in turn forwards (115) it to the first client (101).

When the first client (101) receives the second public encrypted secret from the server (102), the first client (101) decrypts (116) the second public encrypted secret using its private key obtaining the second blinded secret, "0xD4E7". Then, the first client (101) verifies (117) the digital signature of the second blinded secret using the public key of the trusted client (103, 303), and if the digital signature is valid, it further cryptographically unblinds (118) the second blinded secret with the random value obtaining an encrypted secret as follows:
computing a bitwise XOR of the first blinded secret 0x444C, random value 0x1234, i.e:

$$\text{encrypted secret} = XOR(\text{second blinded secret}, \text{random value})$$
$$= XOR(0xD4E7, 0x1234)$$
$$= 0xC6D3$$

being the encrypted secret 0xC6D3. At this point, 0xC6D3 is an encryption of the secret data (1) of the first user, "0x5678" with the random secret key of the trusted client "0x90AB".

Then, the first client (101) signs (119) the encrypted secret using the private key of the first client (101) obtaining a digital signature of the encrypted secret and sends (120) by the first client (101, 301) to the server (102, 302), the encrypted secret and the digital signature of the encrypted secret.

Finally, when the server (102) receives the private encrypted secret and the digital signature of the encrypted secret, it verifies (121) the digital signature of the encrypted secret and if the digital signature of the encrypted secret is valid, the server encrypts (122) the encrypted secret with the public key of the server (102) obtaining a double-encrypted secret and stores (123) the double-encrypted secret in the server (102).

FIG. 2: Public Key Register Blockchain System (202)

FIG. 2 disclosed an embodiment of the computer-implemented method for escrowing data in a server (102) of the present invention. In particular, FIG. 2 represents a previous step of step a), where the first client (201) registers its public key in the blockchain system (202). Firstly, the first client (201) creates (203) a message comprising the public key of the first client (201) and its identification "User1". Secondly, the first client (201) signs (204) the message with his private key and sends (205) the signed message to the blockchain system (202).

Then, the signed message is verified (206) by the nodes of the blockchain system (202), which check the validity of the digital signature and that no client with name User1 already exists. If the name was not registered previously, the global state of the blockchain is updated to include this relationship. The result accept, if the signature is valid, or reject, if the signature is invalid, of this decentralized write operation is eventually returned (207) to the first client (201) via a message from the blockchain system (202).

Modifications to the established association between user name and key may be performed, for example, to update an old key. In this case, the request is signed by the previously associated key. Further, this case should be considered an additional embodiment of the computer-implemented method for escrowing data in a server (102) of the present invention. In particular, there is a previous step from step a) of updating the public key of the first client (202) in the blockchain system (202) which comprises sending a message comprising the new public key of the first client (201) and its identification "User1" wherein the message is signed with the old public key. Then, the signed message is verified (206) by the nodes of the blockchain system (202), which check the validity of the digital signature and that no client with name User1 already exists. As the name was registered previously, the global state of the blockchain is updated to include the new public key associated to this name. The result accept, if the signature is valid, or reject, if the signature is invalid, of this decentralized write operation is eventually returned (207) to the first client (201) via a message from the blockchain system (202).

Therefore, any interested client or server registered in the blockchain system (202), is thus able to access the blockchain system and search for needed keys associated to specific user names, for example, as is required in steps 104 and 109 of FIG. 1 or in the step of verifying the digital signature of the encrypted secret.

The above example, also applies to any of the elements of the system in order to registers its public key in the blockchain system (202).

FIG. 3: Obtaining Secret Data (1)

FIG. 3 shows an example of the implementation by the first client (301) of the computer-implemented method for obtaining escrowed data of a server (302) of the invention. Normally, this situation occurs when the first client (101, 301) losses all his data. Firstly, the first client (301) requests (304) to the server (302), the double-encrypted secret of the first client (301). The secret of the first client (301) has been escrowed as in illustrated in FIG. 1, thus the double-encrypted secret is stored in the server (102, 302). This is similar to perform a previous step of escrowing a secret data according to the embodiment disclosed in FIG. 1.

When the server (302) receives the request, it decrypts (305) the double-encrypted secret using its private key obtaining the encrypted secret, 0xC6D3, and sends (306) the encrypted secret to the first client (301).

When the first client (301) receives the encrypted secret from the server (302), it generates (307) a second public and private client key pairs. Then, the first client fetchs (308) from the blockchain system (202) the public key of the trusted client (303) and encrypts (308) the second public client key and the biometric authenticating data from his finger print with the public key of the trusted client (303) obtaining an encrypted second public client key and sends (309) it to the server (302). Then, the server (302) forwards (310) the encrypted second public client key to the trusted client (303).

When the trusted client (303) receives the encrypted second public client key, it decrypts (311) the encrypted second public client key using its private key obtaining the second public client key and the biometric authenticating data. Additionally, the trusted client (303) verifies the biometric authenticating data comparing if the biometric authenticating data is equal to the biometric authenticating data stored in step i) in the trusted client (303). If the biometric authenticating data are different the trusted client (303) deletes second public client key.

If the biometric authenticating data are similar, the first client (301) encrypts (312) the random secret key "0x90AB" with the second public client key obtaining an encrypted random secret key. Then, the trusted client (303) sends (313) the encrypted random secret key to the server (102, 302), who forwards (314) the encrypted random secret key to the first client (301).

When the first client (301) receives the encrypted random secret key, it decrypts (315) by the first client (101, 301) the encrypted random secret key using its second private key obtaining the random secret key, "0x90AB".

Finally, the first client (101, 301) decrypts (316) the encrypted secret, 0xC6D3, with the random secret key, 0x90AB, by computing by the first client (101, 301) a bitwise XOR of the encrypted secret and the random secret key, obtaining the secret data (1) 0x5678, as follows secret data=XOR(encrypted secret,)=XOR(0xC6D3 0x90AB)=0x5678

Advantageously, the random secret key is encrypted with a second public key which only is known by the first client and the trusted client. Additionally, as the first client (301) recovers from the blockchain system the public key of the trusted client (303), which is later used to encrypt their communications, no man in the middle attacks are possible. Note that this includes the reception by the trusted client (303) of the second public key of the first client (301), which is used to encrypt the random secret key. Hence, the first client (301) knows that only the received data came from the trusted client (303).

The invention claimed is:

1. A computer-implemented method for passwordless escrowing secret data in a server of a client-server network, the client-server network comprising:
   a first client having at least one public and private client key pairs,
   at least one trusted client having at least one public and private trusted client key pairs, wherein the public and private trusted client key pairs are a public key and a private key related to each trusted client,
   a server having a public and private server key pairs,
   a blockchain system comprising a plurality of nodes which are configured to store the public keys of the first client, the at least one trusted client, and the server, the blockchain system being configured to ensure a correctness and a uniqueness of the public keys stored in the plurality of nodes, wherein the method comprises the following steps:
a) fetching, by the first client from the blockchain system, the public key of a trusted client ensuring the correctness and uniqueness of said public key of the trusted client, and
checking, by the first client, in the blockchain system, an identity of the trusted client which stored the public key of the trusted client,
b) cryptographically blinding, by the first client, a secret data with a random value obtaining a first blinded secret,
c) signing, by the first client, the first blinded secret, obtaining a digital signature of the first blinded secret,
d) encrypting, by the first client, the first blinded secret and the digital signature of the first blinded secret using the public key of the trusted client obtaining a first public encrypted secret,
e) sending, by the first client to the server, the first public encrypted secret,
f) forwarding, by the server to the trusted client, the first public encrypted secret,
g) when the trusted client receives the first public encrypted secret from the server, fetching, by the trusted client from the blockchain system, the public key of the first client ensuring the correctness and uniqueness of said public key of the first client, and decrypting, by the trusted client, the first public encrypted secret using the private key of the trusted client obtaining the first blinded secret,
h) verifying, by the trusted client, the digital signature of the first blinded secret using the public key of the first client, if the digital signature is valid the method continues in step i),
i) blindly encrypting, by the trusted client, the first blinded secret with a random secret key obtaining a second blinded secret,
j) signing, by the trusted client, the second blinded secret, obtaining a digital signature of the second blinded secret,
k) encrypting, by the trusted client, the second blinded secret and the digital signature of the second blinded secret using the public key of the first client obtaining a second public encrypted secret,
l) sending, by the trusted client to the server, the second public encrypted secret,
m) forwarding, by the server to the first client, the second public encrypted secret,
n) when the first client receives the second public encrypted secret from the server, decrypting, by the first client, the second public encrypted secret using the private key of the first client obtaining the second blinded secret,
o) verifying, by the first client, the digital signature of the second blinded secret using the public key of the trusted client, if the digital signature is valid the method continues in step p),
p) cryptographically unblinding, by the first client, the second blinded secret with the random value, obtaining an encrypted secret,
q) signing, by the first client, the encrypted secret using the private key of the first client obtaining a digital signature of the encrypted secret,
r) sending, by the first client to the server, the encrypted secret and the digital signature of the encrypted secret,
s) when the server receives the encrypted secret and the digital signature of the encrypted secret, verifying the digital signature of the encrypted secret using the public key of the first client, and if the digital signature of the encrypted secret is valid, encrypting, by the server, the encrypted secret with the public key of the server obtaining a double-encrypted secret and storing the double-encrypted secret in the server.

2. The computer-implemented method according to claim 1, wherein the cryptographically blinding in step b) comprises,
calculating by the first client the random value,
computing by the first client a bitwise XOR of the random value and the secret data obtaining the first blinded secret.

3. The computer-implemented method according to claim 2, wherein the cryptographically unblinding in step p) comprises computing by the first client a bitwise XOR of the random value and the second blinded secret obtaining the encrypted secret.

4. The computer-implemented method according to claim 1, wherein the encrypting in step d) comprises further encrypting by the first client, a biometric authenticating data of the first client using the public key of the trusted client obtaining the first public encrypted secret.

5. The computer-implemented method according to claim 4, wherein the step i) further comprises storing by the trusted client, the biometric authenticating data of the first client.

6. The computer-implemented method according to claim 1, wherein the blindly encrypting in step i) comprises:
calculating by the trusted client the random secret key, and
computing by trusted client a bitwise XOR of the random secret key and the first blinded secret obtaining the second blinded secret.

7. A computer-implemented method for passwordless obtaining secret data of a server of a client-server network, wherein said secret data is escrowed in a client-server network, the client-server network comprising:
a first client having at least one public and private client key pairs,
at least one trusted client having at least one public and private trusted client key pairs, wherein the public and private trusted client key pairs are a public key and a private key related to each trusted client,
a server having a public and private server key pairs,
a blockchain system comprising a plurality of nodes which are configured to store the public keys of the first client, the at least one trusted client, and the server, the blockchain system being configured to ensure the correctness and uniqueness of the public keys stored in the plurality of nodes,
wherein the method comprises the following steps:
1) requesting, by the first client to the server, a double-encrypted secret of the first client,
2) when the server receives the request, decrypting, by the server, the double-encrypted secret using its private key obtaining an encrypted secret,
3) sending, by the server to the first client, the encrypted secret,
4) when the first client receives the encrypted secret from the server, generating, by the first client, a second public and private client key pairs,
5) fetching, by the first client from the blockchain system, the public key of a trusted client ensuring the correctness and uniqueness of said public key of the trusted client, and encrypting, by the first client, the second public client key with the public key of the trusted client obtaining an encrypted second public client key,
6) sending, by the first client to the server, the encrypted second public client key,
7) forwarding, by the server to the trusted client, the encrypted second public client key,
8) when the trusted client receives the encrypted second public client key from the server, decrypting, by the trusted client, the encrypted second public client key using the private key of the trusted client obtaining the second public client key and encrypting a random secret key with the second public client key obtaining an encrypted random secret key,
9) sending, by the trusted client to the server, the encrypted random secret key,
10) forwarding, by the server to the first client, the encrypted random secret key,
11) when the first client receives the encrypted random secret key, decrypting, by the first client, the encrypted random secret key using its second private key obtaining the random secret key,
12) decrypting, by the first client, the encrypted secret using the random secret key obtaining the secret data.

8. The computer-implemented method according to claim 7, wherein the secret data is escrowed, wherein the decrypting in step 12) comprises computing by the first client a bitwise XOR of the random secret key and the encrypted secret obtaining the secret data.

9. The computer-implemented method according to claim 7, wherein the encrypting in step 5) further comprises encrypting the second public client key and a biometric authenticating data of the first client with the public key of the trusted client obtaining the encrypted second public client key.

10. The computer-implemented method according to claim 7, wherein the secret data is escrowed, wherein the step 8) further comprises:
verifying the biometric authenticating data of the first client,
if the biometric authenticating data of the first client is valid continue with step 9) and
if the biometric authenticating data of the first client is invalid deleting the encrypted random secret key.

11. A system comprising:
a first client having at least one public and private client key pairs;
at least one trusted client having at least one public and private trusted client key pairs, wherein the public and private trusted client key pairs are a public key and a private key related to each trusted client,
a server having a public and private server key pairs,
a blockchain system comprising a plurality of nodes which are configured to store the public keys of the first client, the at least one trusted client, and the server, the blockchain system being configured to ensure a correctness and a uniqueness of the public keys stored in the plurality of nodes;
wherein
a) the first client is configured to fetch from the blockchain system the public key of a trusted client ensuring the correctness and uniqueness of said public key of the trusted client, and
check, in the blockchain system, an identity of the trusted client which stored the public key of the trusted client,
b) the first client is configured to cryptographically blind a secret data with a random value obtaining a first blinded secret, c) the first client is configured to sign the first blinded secret, obtaining a digital signature of the first blinded secret,
d) the first client is configured to encrypt the first blinded secret and the digital signature of the first blinded secret using the public key of the trusted client obtaining a first public encrypted secret,
e) the first client is configured to send, to the server, the first public encrypted secret,
f) the server is configured to forward, to the trusted client, the first public encrypted secret,
g) the trusted client is configured to, when the trusted client receives the first public encrypted secret from the server, fetch from the blockchain system the public key of the first client ensuring the correctness and uniqueness of said public key, and decrypt the first public encrypted secret using the private key of the trusted client obtaining the first blinded secret,
h) the trusted client is configured to verify the digital signature of the first blinded secret using the public key of the first client,
i) the trusted client is configured to blindly encrypt the first blinded secret with a random secret key obtaining a second blinded secret,
j) the trusted client is configured to sign the second blinded secret, obtaining a digital signature of the second blinded secret,
k) the trusted client is configured to encrypt the second blinded secret and the digital signature of the second blinded secret using the public key of the first client obtaining a second public encrypted secret,
l) the trusted client is configured to send to the server, the second public encrypted secret,
m) the server is configured to forward the second public encrypted secret,
n) when the first client receives the second public encrypted secret from the server, the first client is configured to decrypt the second public encrypted secret using the private key of the first client obtaining the second blinded secret,
o) the first client is configured to verify the digital signature of the second blinded secret using the public key of the trusted client,
p) the first client is configured to cryptographically unblind the second blinded secret with the random value, obtaining an encrypted secret,
q) the first client is configured to sign the encrypted secret using the private key of the first client obtaining a digital signature of the encrypted secret,
r) the first client is configured to send to the server, the encrypted secret and the digital signature of the encrypted secret,
s) when the server receives the encrypted secret and the digital signature of the encrypted secret, the server is configured to verify the digital signature of the encrypted secret using the public key of the first client, and if the digital signature of the encrypted secret is valid, the server is configured to encrypt the encrypted secret with the public key of the server obtaining a double-encrypted secret and storing the double-encrypted secret in the server;

wherein the first client, the at least one trusted client, the server, and the blockchain system are hardware.

* * * * *